United States Patent [19]

Bening et al.

[11] Patent Number: 5,681,895
[45] Date of Patent: Oct. 28, 1997

[54] COUPLING OF ANIONIC POLYMERS WITH TRIALKOXYSILANES HAVING SILICON-HYDROGEN BONDS

[75] Inventors: Robert Charles Bening, Katy; Ronald James Hoxmeier, Houston, both of Tex.

[73] Assignee: Shell Oil Company, Houston, Tex.

[21] Appl. No.: 705,032

[22] Filed: Aug. 29, 1996

Related U.S. Application Data

[63] Continuation of Ser. No. 424,836, Apr. 19, 1995, abandoned.

[51] Int. Cl.⁶ .............................. C08C 19/44; C08F 4/72
[52] U.S. Cl. ........................... 525/105; 525/106; 525/342
[58] Field of Search ................................ 525/105, 106, 525/342

[56] References Cited

U.S. PATENT DOCUMENTS

| | | | |
|---|---|---|---|
| Re. 27,145 | 6/1971 | Jones | 525/272 |
| 3,244,664 | 4/1966 | Zelinski et al. | |
| 3,692,874 | 9/1972 | Farrer et al. | 525/105 |
| 3,840,616 | 10/1974 | Clark et al. | 525/105 |
| 3,880,954 | 4/1975 | Kahle et al. | |
| 4,185,042 | 1/1980 | Verkouw | 525/332 |
| 5,266,644 | 11/1993 | Riffle et al. | |
| 5,266,649 | 11/1993 | Balas et al. | |
| 5,331,058 | 7/1994 | Shepherd et al. | 525/332.3 |
| 5,391,663 | 2/1995 | Bening et al. | 526/178 |
| 5,416,168 | 5/1995 | Willis et al. | 525/333.2 |

FOREIGN PATENT DOCUMENTS 0070994  7/1981  European Pat. Off. .

*Primary Examiner*—Ralph H. Dean
*Attorney, Agent, or Firm*—Keith M. Tackett

[57] ABSTRACT

A high yield of three armed radial anionic polymers is produced by the process of coupling metal terminated anionic polymers with a trialkoxysilane having a silicon-hydrogen bond, preferably trimethoxysilane. The metal terminated anionic polymer is preferably produced by initiating polymerization with a protected functional initiator which is readily converted to terminal hydroxyl groups or derivatives thereof for use in adhesives, sealants, and coatings.

14 Claims, No Drawings

COUPLING OF ANIONIC POLYMERS WITH TRIALKOXYSILANES HAVING SILICON-HYDROGEN BONDS

This is a continuation of application Ser. No. 424,836, filed Apr. 19, 1995, now abandoned.

FIELD OF THE INVENTION

This invention relates to coupling of anionic polymers and to functionalized radial polymers used as components in adhesives, sealants, and coatings.

BACKGROUND OF THE INVENTION

Anionic polymerization of conjugated dienes with lithium initiators, such as sec-butyllithium, and hydrogenation of residual unsaturation has been described in many references including U.S. Pat. No. Re. 27,145 which teaches a relationship between the amount of 1,2-addition of butadiene and the glass transition temperatures of the hydrogenated butadiene polymers.

Anionic polymerization using protected functional initiators having the structure:

is described in U.S. Pat. No. 5,331,058 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms. Initiators of the general structure (1), in which $R^1$=t-butyl and $R^2$=$R^3$=methyl, ethyl, or n-propyl and A' is an alkyl-substituted or non-substituted propyl bridging group or an alkyl-substituted or non-substituted octyl bridging group were demonstrated to be preferred due to their higher activity in U.S. Pat; No. 5,391,663 (TH0010). Polymerization with such a protected functional initiator, followed by capping to produce a second terminal functional group, produces difunctional polymers which sometimes can be prepared by capping polymers prepared with difunctional initiators such as 1,4-dilithiobutane and lithium naphthalide. Moreover, the use of a protected functional initiator permits formation of heterofunctional polymers having at least two different terminal functional groups on each difunctional molecule.

A preferred way to prepare difunctional polymers described in U.S. patent application Ser. No. 220,804 filed Mar. 31, 1994 (TH0404), which description is incorporated by reference herein, is to use a protected functional initiator having the structure:

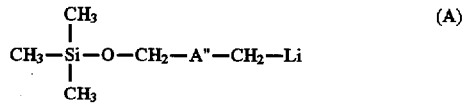

wherein A" is cyclohexyl or —CR'R"—, wherein R' is a linear alkyl having from 1 to 10 carbon atoms and R" is hydrogen or a linear alkyl having from 1 to 10 carbon atoms. The compounds of structure (A) initiate polymerization of conjugated monomers at moderate polymerization temperatures. The protected functional group survives hydrogenation of conjugated diene polymers and is readily removed by hydrolysis in the presence of methanesulfonic acid. The initiators of structure (A) can be used to make telechelic polymers by capping with ethylene oxide or oxetane.

The coupling of anionic polymers to make radial polymers is decribed in many references including U.S. Pat. No. 4,185,042 which teaches that the difficulty in obtaining complete coupling with tetramethoxysilane or trimethoxymethylsilane is overcome by using one epoxide group with two or three alkoxy groups to make radial anionic polymers. The epoxide group readily reacts with a lithium terminated anionic polymer leaving a hydroxyl group at the coupling site. More efficient coupling can also be acheived by using chlorosilanes, such trichloromethylsilane. However, the by-product of the coupling reaction, LiCl, can be a problem in subsequent process steps, particularly if the product is to be hydrogenated.

It is an object of the present invention to couple anionic polymers in high yield to form radial polymer without introducing hydroxyl functionality at the coupling site. The stated object would be most beneficial to hydrogenated radial anionic polymers having only terminal hydroxyl groups.

SUMMARY OF THE INVENTION

The present invention includes a three armed radial anionic polymer which is produced by the process of coupling metal terminated anionic polymers with a trialkoxysilane having a silicon-hydrogen bond, preferably trimethoxysilane. The metal terminated anionic polymer is preferably produced by initiating polymerization with a protected functional initiator which is readily converted to terminal hydroxyl groups or derivatives thereof for use in adhesives, sealants, and coatings.

DETAILED DESCRIPTION OF THE INVENTION

The present invention includes radial anionic polymers that are produced by the process of polymerizing metal terminated linear anionic polymers from conjugated dienes, such as butadiene or isoprene, or monovinyl aromatics, such as styrene, or combinations thereof using a metal initiator, such as mono-lithium initiators, and coupling the linear anionic polymers with a trialkoxysilane having a silicon-hydrogen bond.

The lithium initiator process is well known as described in U.S. Pat. Nos. 4,039,593 and Re. 27,145 which descriptions are incorporated herein by reference. Typical living polymer structures that can be made with lithium initiators include:

X-B-Li
X-B/A-Li
X-A-B-Li
X-B-A-Li
X-B-B/A-Li
X-B/A-B-Li
X-A-B-A-Li wherein B represents polymerized units of one or more conjugated diene hydrocarbons, A represents polymerized units of one or more vinyl aromatic compounds, B/A represents random polymerized units of the conjugated diene hydrocarbons and the vinyl aromatic monomers, and X is the residue of the lithium initiator.

In the present invention, X is preferably a trimethylsilyl ether group as described below and cleavage of the trimethylsilyl ether leaves a neopentyl-like primary alcohol group in this position. These primary alcohols have different reactivity than other primary alcohol groups which will lead to different rates of reaction for the chain ends with diisocyanates and dicarboxylic acids and the like. This difference in reactivity rates could be very useful in designing materials where stepwise polymerization is desired.

Anionic polymerization of conjugated dienes and other unsaturated monomers using protected functional initiators having the structure R¹R²R³Si-O-A'-Li (Structure 1) is described in U.S. Pat. No. 5,331,058 wherein R¹, R², and R³ are preferably alkyl, alkoxy, aryl, or alkaryl groups having from 1 to 10 carbon atoms, and A' is preferably a branched or straight chain bridging group having at least 2 carbon atoms.

A preferred protected functional initiator for making homopolymers of conjugated dienes and block or random copolymers of conjugated dienes and vinyl aromatic compounds has a trimethyl silyl protecting group with the structure:

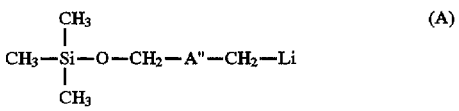

wherein A" is cyclohexyl or —CR'R"—, wherein R' is a linear alkyl having from 1 to 10 carbon atoms and R" is hydrogen or a linear alkyl having from 1 to 10 carbon atoms.

The compounds of structure (A) initiate polymerization of conjugated diene monomers such as butadiene and isoprene at moderate polymerization temperatures. The protected functional group survives hydrogenation of conjugated diene polymers and is readliy removed by hydrolysis in the presence of methanesulfonic acid.

The preferred initiators used in the present invention are similar to s-butyllithium with regard to economical operating temperature and low amounts of dead initiator and a uniform, control led level of 1,2-addition of diene in the product polymer. However the prefered initiators have the advantage of placing a silyl ether group at the start of the polymer chain which serves as a "masked" or "protected" alcohol, capable of conversion to a primary, neopentyl-type alcohol group after polymerization is completed, by acid-catalyzed hydrolysis under mild, low cost conditions or as described in WO 91/12277.

While the initiators described in U.S. Pat. No. 5,331,058 would generally afford, after polymerization and deprotection, a polymer having primary alcohol functionality, a polymer having primary alcohol functionality of the neopentyl-type, obtained from initiators of Structure (A), should have improved thermal stablity. Condensation polymers derived from products made with these initiators should also have improved hydrolytic stabilty. The improved thermal stability of neopentyl alcohol and the hydrolytic characteristics of its derivatives are summarized in Advanced Organic Chemistry, Third Edition, by J. March, John Wiley & Sons, New York (1985) (see particularly pp. 285, 299, 390, 514, 944, 955, 959, and references therein). It is reasonable that polymers having this special structure would have similarly improved properties.

The initiators used in the present invention are very active at room temperature and polymerization is preferably initiated at a temperature from 15° C. to 60° C., most preferably from 30° C. to 40° C. It is generally advisable to keep the polymerization temperature below about 100° C.; above this temperature, side reactions that change microstructure and limit coupling efficiency may become important. Polymerizations can be carried out over a range of solids levels, preferably from about 5% to about 80% wt polymer, most preferably from about 10% to about 40% wt. For high solids polymerizations, it is preferable to add the monomer in increments to avoid exceeding the desired polymerization temperature. If the initiator is to be added to the full monomer charge, it is preferable to run the polymerization between 10% and 20% wt solids. It is preferable to add the alkoxysilanes of the present invention at a ratio of about one alkoxy group per living chain. That is, to produce a three arm radial polymer, add one mole of the trialkoxysilane for every three moles of polymeric lithium ion. It is preferrable to perform the coupling reaction at a temperature of 30° C. to 80° C. It is also preferable to add the coupling agent as soon as polymerization is complete. If the polymeric lithium ion is held at this temperature for long periods of time, termination reactions that limit coupling may occur.

When the conjugated diene is 1,3-butadiene and when the conjugated diene polymer will be hydrogenated, the anionic polymerization of the conjugated diene hydrocarbons is typically controlled with structure modifiers such as diethyl ether or glyme (1,2-diethoxyethane) to obtain the desired amount of 1,2-addition. As described in Re 27,145 which is incorporated by reference herein, the level of 1,2-addition of a butadiene polymer or copolymer can greatly affect the rheology and elastomeric properties of the polymer after hydrogenation. The hydrogenated polymers exhibit improved heat stability and weatherability in the final, adhesive, sealant or coating.

The 1,2-addition of 1,3-butadiene polymers having terminal functional groups influences the viscosity of the polymers as described in more detail below. A 1,2-addition of about 40% is achieved during polymerization at 50° C. with at least about 6% by volume of diethyl ether or about 1000 ppm of glyme. Generally, vinyl contents in this range are desirable if the product is to be hydrogenated, while low vinyl contents are preferred if the polymer is to be used in its unsaturated form.

Protected functional initiators are preferred as described below and are prepared as described in U.S. Pat. No. 5,331,058 which description is incorporated by reference herein. A variety of processes for removal of the protecting groups are known; for a review, see T. W. Greene, "Protective Groups in Organic Synthesis", J. Wiley and Sons, New York, 1981, incorporated herein by reference. A preferable process would involve easily handled, relatively low toxicity, and inexpensive reagents. In a preferred process, the preferred trimethyl silyl group is removed by reaction of the polymer solution with 1–10 equivalents (basis silyl end groups) of a strong organic acid, preferably methanesulfonic acid (MSA), in the presence of 0.1%–2% by weight of water and 5%–50% by volume of isopropanol (IPA) at about 50° C.

The process of the invention can result in release of fine particles of lithium bases which may be removed before hydrogenation, as described in U.S. Pat. No. 5,166,277 which is incorporated by reference herein. The lithium bases may interfere with hydrogenation of the polymer, especially if the hydrogenation is to be carried out at high solids. However, as detailed in the Examples, acceptable hydrogenation can be acheived without removal of the lithium when the coupling agents of the present invention are employed.

Hydrogenation of at least 90%, preferably at least 95%, of the unsaturation in low molecular weight butadiene polymers is preferably achieved with nickel catalysts as described in U.S. Pat. Nos. Re. 27,145 and 4,970,254 and U.S. patent application Ser. No. 07/785,715, now U.S. Pat. No. 5,166,277 which are incorporated by reference herein. The preferred nickel catalyst is a mixture of nickel 2-ethylhexanoate and triethylaluminum described in more detail in the examples. It is preferable to extract the nickel catalyst after hydrogenation by stirring the polymer solution with aqueous phosphoric acid (2–30 percent by weight), at a volume ratio of about 0.5 parts aqueous acid to 1 part polymer solution, at about 50° C. for 30–60 minutes while sparging with a mixture of oxygen in nitrogen. This step is also described in more detail in the examples. The presence of high levels of lithium chloride during the acid extraction, as would occur if a chlorosilane coupling agent was used, necessitates special engineering considerations. Due to the high corrosivity of acidic aqueous solutions that are high in chloride towards carbon steel and most stainless steel alloys, the use of glass or special, relatively expensive, alloys for the contact surfaces of the acid extraction vessel would be recommended.

Saturated or unsaturated radial conjugated diene polymers can be obtained having about three terminal functional group selected from hydroxyl, carboxyl, phenol, epoxy, and amine groups; the latter functional groups can be obtained from further derivatization of the hydroxyl groups. These products can be used without solvents when the viscosity of the polymer is less than about 500 poise at mixing and application temperature. Three-armed radial hydrogenated butadiene or isoprene polymers having three terminal hydroxyl groups per molecule and lower viscosity than 500 poise at mixing and application temperatures are produced by limiting the peak molecular weight to a range from about 500 to 20,000 and by limiting the 1,2-addition of hydrogenated butadiene to an amount between 30% and 70%, preferably between 40% to 60%.

After polymerization and, optionally, hydrogenation and washing of the polymer, the trimethylsilyl group at the front of the preferred polymer chain is removed to generate the desired primary, neopentyl-type hydroxyl functional group. This step is often referred to as deprotection. A variety of processes for removal of the silyl protecting group are known; for a review, see T. W. Greene, "Protective Groups in Organic Synthesis", J. Wiley and Sons, New York, 1981. Deprotection preferably involves easily handled, relatively low toxicity, inexpensive reagents and mild, low cost process conditions. Reaction with tetrabutylammonium fluoride in THF, as described in WO 91 112277, is disadvantaged due to the high cost and toxicity of the reagents. In a preferred process, the trimethylsilyl group and the spent Ni/Al catalyst are removed in a single step. This technique avoids the cost associated with a separate process step for deprotection. For the preparation of an unsaturated polymer where hydrogenation catalyst extraction is not required, hydrolysis in the presence of methanesulfonic acid, as described above, is preferred.

For some applications, such as coatings prepared by baked cures of the polymer with amino resins in the presence of a strong organic acid catalyst, it may be preferable to use the polymer in its "protected" form. The viscosity of the protected polymer is lower and conditions such as those described above should accomplish the deprotection (generate the alcohol) during the cure.

The conjugated diene polymers produced as described above have the conventional utilities for terminally functionalized polymers such as forming adhesives, coatings, and sealants. Additionally. the polymers may be used to modify polyurethanes, polyesters, polyamides, polycarbonates, and epoxy resins.

DETAILED DESCRIPTION OF PREFERRED EMBODIMENTS

A preferred radial anionic polymer having terminal functional groups is produced by the process comprising the steps of polymerizing lithium terminated linear anionic polymers from conjugated dienes, such as isoprene or butadiene, or combinations of conjugated dienes and monoalkenyl aromatics, such as styrene, using a protected functional initiator having the structure:

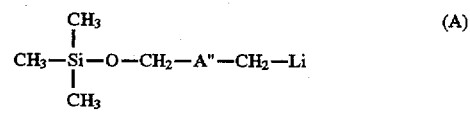

(A)

wherein A" is cyclohexyl or —CR—R"—, wherein R' is a linear alkyl having from 1 to 10 carbon atoms and R" is hydrogen or a linear alkyl having from 1 to 10 carbon atoms, coupling the linear anionic polymers with a trialkoxysilane having a silicon-hydrogen bond, hydrogenating the polymerized conjugated diene, and reacting the hydrogenated radial polymer with a compound that replaces the trimethylsilyl groups from the lithium initiator with hydrogen to give terminal hydroxyl groups.

The most preferred process for making the terminally functionalized radial polymer uses the initiator having the following structure:

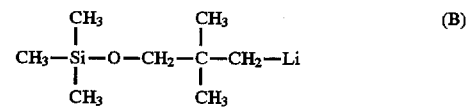

(B)

(3-lithio-2,2-dimethyl-1-trimethylsilyloxypropane) to produce linear conjugated diene polymers having a peak molecular weight from 500 to 200,000, most preferably from 500 to 20,000. After coupling with trimethoxysilane, the polymers can be unsaturated when 1,2-addition is from 5% to 95% or hydrogenated when 1,2-addition is from 30% to 70%. The radial polymers preferably have from 2.75 to 3.0, most preferably from 2.90 to 3.0, terminal hydroxyl groups per molecule.

The preferred polymers of the present invention are useful in adhesives (including pressure sensitive adhesives, contact adhesives, laminating adhesives and assembly adhesives), sealants (such as urethane architectural sealants, etc.), coatings (such as topcoats for automotive, epoxy primers for metal, polyester coil coatings, alkyd maintenance coatings, etc.), films (such as those requiring heat and solvent resistance), molded and extruded thermoplastic and thermoset parts (for example thermoplastic injection molded polyurethane rollers or reaction injection molded thermoset auto bumper, facie, etc.).

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

The trihydroxylated conjugated diene polymers of the present invention may also be blended with other polymers to improve their impact strength and/or flexibility. Such polymers are generally condensation polymers including polyamides, polyurethanes, vinyl alcohol polymers, vinyl ester polymers, polysulfones, polycarbonates and polyesters, including those, like polyacetones, which have a recurring ester linkage in the molecule, and those, like polyalkylene arylates, including polyalkylene terephthalates, having a structure formed by polycondensation of a dicarboxylic acid with a glycol. The blends may be made in the reactor or in a post compounding step.

The present invention is further described by the following examples which include the best mode known to Applicant for making a radial, saturated polybutadiene having terminal hydroxyl groups (EB Triol). The examples are not intended to limit the present invention to specific embodiments although each example may support a separate claim which Applicant asserts to be a patentable invention.

The peak molecular weights were measured using gel permeation chromatography (GPC) calibrated with polybutadiene standards having known peak molecular weights. The solvent for the GPC analyses was tetrahydrofuran.

The percentage of 1,2-additions of polybutadiene, molecular weight, and extent of hydrolysis of the protected alcohol were measured by $^{13}C$ NMR or $^1H$ NMR in chloroform solution.

High Performance Liquid Chromatography (HPLC) could also be used to determine the relative amounts of the desired trihydroxy material (triol), and mono-hydroxy or di-hydroxy material that might have resulted from incomplete coupling. The HPLC separation was accomplished with a 250mm× 4.6mm 5 micron DIOL phase column using a stepped heptane/tetrahydrofuran gradient. An evaporative light scattering detector is used to quantify the sample.

EXAMPLE 1

Reaction of the preferred lithium initiator of U.S. Pat. No. 5,391,663 with butadiene effectively initiated polymerization and reaction of the living polymer product with trimethoxysilane afforded, after isolation, a high yield of a three-armed, high 1,4, polybutadienyl tri-ol.

A solution of the 3-(t-butyldimethylsilyloxy)-1-propyllithium (RLi) (105.71 g of solution, 12.8% wt RLi, 0.075 mol RLi) in cyclohexane, was added, under nitrogen, to a solution of polymerization grade butadiene monomer (100 g, 1.85 mol) in cyclohexane (856 g) with vigorous stirring in a glass autoclave at 30° C. The resulting exothermic reaction raised the solution temperature to 47° C. in about 37 minutes. The temperature was then increased to 60° C. After a total reaction time of 137 minutes, a small sample was removed and then quenched with methanol, then 3.1 g (0.025 mol) of trimethoxysilane was added to the autoclave. The reaction temperature was increased to 70° C. After 1 hour, the temperature was decreased to 40° C. and 3.3 ml of methanol was added. A large amount of white precipitate (lithium methoxide) had formed in the course of the reaction. The solution was washed with 200 ml 3% wt aqueous phosphoric acid at about 57° C., and a sample was dried for analysis.

The sample collected prior to addition of the coupling agent was found to have a number average molecular weight ($M_n$) of 1,470 as measured by a $^{13}C$ Nuclear Magnetic Resonance (NMR) method which compares the ratio of the carbon signal that is attributed to the alkyl segment of the initiator to the total carbon signal for the sample; this compares favorably with the expected value of 1,500. Analysis of this sample for vinyl content, also using an NMR technique, found that 11% of the butadiene had added by 1,2-polymerization affording pendant vinyl unsaturation with the remainder added by 1,4-polymerization giving enchained unsaturation species. The number average molecular weight as measured by a gel permeation chromatography (GPC) technique was found to be 1,200. This value is probably lower because this molecular weight is near the limit of the linear performance of the column. After the coupling reaction, a single peak was observed and the $M_n$ increased to 2,800, roughly three times the arm molecular weight.

After decanting the aqueous layer, a solution containing 232 ml isopropanol, 12.7 ml methanesulfonic acid and 1.7 ml water was added to the polymer cement. Reaction was allowed to proceed at about 55° C. for 2.5 hours. The cement was washed with dilute aqueous potassium carbonate and then water, and dried in a rotary evaporator. $^{13}C$ NMR analysis was consistent with 97% hydrolysis of the silyl ether. The HPLC chromatogram of this product consisted of two peaks; 90% of the area was at very high retention time, consistent with the expected triol product, the remaining 10% was at the retention time assigned to diol. No monofunctional or non-functional material was detected.

EXAMPLE 2

A butadiene radial polymer was prepared using the preferred initiator, 3-lithio-2,2-dimethyl-1-trimethylsilyloxypropane and hydrogenated using a Ni/Al catalyst; the saturated polymer product was deprotected under the conditions used to extract the spent hydrogenation catalyst affording the desired hydrogenated, poly(ethylene/butylene) tri-ol.

A solution of the 3-lithio-2,2-dimethyl-1-trimethylsilyloxypropane (RLi) (71.54 g of solution, 11.6% wt RLi, 0.05 mol RLi) in cyclohexane, was added, under nitrogen, to a solution of polymerization grade butadiene monomer (100 g, 1.85 mol) in a mixed cyclohexane/diethyl ether (712 g cyclohexane/100 g diethyl ether) solvent with vigorous stirring in a glass autoclave at 30° C. The resulting exothermic reaction raised the solution temperature to 62° C. in about 15 minutes. 2.04 g (0.017 mol) of trimethoxysilane was added to the autoclave at this time,. The temperature was maintained at about 40° C. for 40 minutes and then 2.2 ml of methanol was added. A large amount of white precipitate (lithium methoxide) had formed in the course of the reaction. GPC analysis of the coupled product indicated a single peak with an $M_n$ of 5,000, in good agreement with the expected triol molecular weight of 6,000. Although no sample of the "arm" was taken prior to coupling, the ratio of initiator residues ("X" in the previous structures) to butadiene monomer residues determined by $^1H$ NMR can be used to estimate the number average molecular weight of the arm. The measure value of 2,000±100 is in good agreement with the expected value of 2,000.

The hydrogenation catalyst (Ni/Al) for this experiment was prepared in advance by combining nickel 2-ethylhexanoate with triethylaluminum in cyclohexane in amounts sufficient to give a ratio of 2.5 moles of Al to 1 mole of Ni. The polymer cement was transferred to a 500 cc steel autoclave and sparged with hydrogen at 40° C. No filtration or centrifugation step was employed to remove the precipitated lithium methoxide, but most had settled out on standing and was not transferred. The reactor was then pressured up to 700 psig with hydrogen and the Ni/Al catalyst added in aliquots. The reaction temperature was maintained between 60° C. and 80° C. Sufficient Ni/Al catalyst was eventually added to bring the total solution concentration of Ni to 200 ppm. After 2 hr of hydrogenation, an aliquot of the product was removed and latter analyzed for unreacted C=C moieties using an ozone titration technique; at this time the catalyst concentration was 200 ppm. This analysis found that over 98% of the starting polybutadienyl unsaturation had been hydrogenated (0.14 meq/g). Hydrogenation continued after increasing the catalyst concentration to 290 ppm. Analysis of the final product indicated of over 99% hydrogenation of the unsaturation (0.03 meq/g).

Much of the hydrogenation catalyst settled out on standing. 323 g of the essentially clear cement was transferred to a resin kettle and the protecting groups were removed by hydrolysis with methanesulfonic acid and water in the presence of isopropanol, (3.14 g, 1.5 g and 77 g, respectively) as described in Example 1. After washing this solution with water and removal of the solvent, a viscous, clear, colorless liquid was obtained; the product became hazy as it cooled due to slight crystallinity imparted by the hydrogenated 1,4 repeat units. There was no evidence of residues of either lithium salts or hydrogenation catalyst. $^1$H NMR indicated 97% hydrolysis of the silyl ether protecting groups to the desired hydroxyl product.

We claim:

1. A radial anionic polymer, produced by the process comprising the steps of:

polymerizing metal terminated linear anionic polymers from conjugated dienes, monovinyl aromatics, or combinations thereof using a metal initiator; and coupling the linear anionic polymers with a coupling agent consisting of a trialkoxysilane having a silicon-hydrogen bond.

2. The radial polymers of claim 1, wherein the trialkoxysilane is trimethoxysilane.

3. The radial polymers of claim 1, wherein the metal initiator is a protected functional initiator.

4. The radial polymers of claim 1, wherein the radial polymers comprise polymerized conjugated diene, and are further produced by the process of hydrogenating the polymerized conjugated diene.

5. A radial anionic polymer having terminal functional groups, produced by the process comprising the steps of:

polymerizing lithium terminated linear anionic polymers from conjugated dienes or combinations of conjugated dienes and monoalkenyl aromatics using a protected functional initiator having the structure:

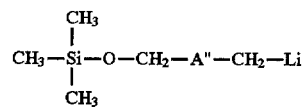

wherein A" is cyclohexyl or —CR'R"—, wherein R' is a linear alkyl having from 1 to 10 carbon atoms and R" is hydrogen or a linear alkyl having from 1 to 10 carbon atoms;

coupling the linear anionic polymers with a coupling agent consisting of a trialkoxysilane having a silicon-hydrogen bond;

hydrogenating the polymerized conjugated diene; and reacting the hydrogenated radial polymer with a compound that replaces the trimethylsilyl groups from the lithium initiator with hydrogen to give terminal hydroxyl groups.

6. The radial polymers of claim 5, wherein the trialkoxysilane is trimethoxysilane.

7. The radial polymer of claim 5, wherein the linear anionic polymer comprises homopolyisoprene or homopolybutadiene having a number average molecular weight from 500 to 20,000.

8. The radial polymer of claim 5, wherein A" in the initiator is —CR'R"— and R" is methyl.

9. The radial polymer of claim 8, wherein R' is methyl.

10. A process for making radial anionic polymers having terminal functional groups, comprising the steps of:

polymerizing lithium terminated linear anionic polymers from conjugated dienes or combinations of conjugated dienes and monoalkenyl aromatics using a protected functional initiator having the structure:

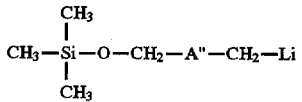

wherein A" is cyclohexyl or —CR'R"—, wherein R' is a linear alkyl having from 1 to 10 carbon atoms and R" is hydrogen or a linear alkyl having from 1 to 10 carbon atoms;

coupling the linear anionic polymers with a coupling agent consisting of a trialkoxysilane having a silicon-hydrogen bond;

hydrogenating the polymerized conjugated diene; and reading the hydrogenated radial polymer with a compound that replaces the trimethylsilyl groups from the lithium initiator with hydrogen to give terminal hydroxyl groups.

11. The process of claim 10, wherein the trialkoxysilane is trimethoxysilane.

12. The process of claim 10, wherein the linear anionic polymer comprises homopolyisoprene or homopolybutadiene having a number average molecular weight from 500 to 20,000.

13. The process of claim 10, wherein A" in the initiator is —CR'R"— and R" is methyl.

14. The process of claim 13, wherein R' is methyl.

* * * * *